United States Patent [19]

Lehn et al.

[11] 4,224,429
[45] * Sep. 23, 1980

[54] PROCESS FOR THE ANIONIC POLYMERIZATION IN THE PRESENCE OF CRYPTANTS

[75] Inventors: Jean-Marie Lehn, Strasbourg; Francois Schue, Lutzelhouse; Sylvie Boileau, Paris; Alain A. Cau, Loire; Bernd Kaempf, Strasbourg; Jean R. Moinard, Vert le Petit; Serge F. Raynal, Villejuif, all of France

[73] Assignee: Societe Nationale des Poudres et Explosifs, Paris, France

[*] Notice: The portion of the term of this patent subsequent to Jun. 17, 1992, has been disclaimed.

[21] Appl. No.: 823,590

[22] Filed: Aug. 11, 1977

Related U.S. Application Data

[60] Continuation-in-part of Ser. No. 539,729, Jan. 9, 1975, Pat. No. 4,116,887, which is a division of Ser. No. 401,119, Sep. 26, 1973, Pat. No. 3,890,278.

[30] Foreign Application Priority Data

Oct. 3, 1972 [GB] United Kingdom ............... 45482/72
Jul. 30, 1973 [GB] United Kingdom ............... 36257/73

[51] Int. Cl.$^2$ .......................... C08F 4/46; C08F 4/50; C08G 63/10; C08G 65/12; C08G 77/08; C08G 63/62

[52] U.S. Cl. .................................... 526/183; 526/191; 526/204; 526/205; 528/95; 528/224; 528/233; 528/14; 528/239; 528/314; 528/358; 528/368; 528/371; 528/379; 528/409; 528/413; 528/424; 568/679

[58] Field of Search ................. 260/2 A, 2 R, 2 XA, 260/2 EN, 2 D, 615 B, 46.5 R, 47 A, 67 FP, 78 L, 78 P, 78.3 R, 79.7; 526/183, 191, 204, 205; 528/95, 224, 233, 239, 314, 14, 358, 368, 371, 379, 413, 409, 424

[56] References Cited

U.S. PATENT DOCUMENTS

| | | | |
|---|---|---|---|
| 3,159,647 | 12/1964 | Poppelsdorf | 260/309.7 |
| 3,412,073 | 11/1968 | Hogsed | 260/78.3 |
| 3,451,988 | 6/1969 | Langer, Jr. | 260/94.6 |
| 3,462,398 | 8/1969 | Wagner et al. | 260/78.3 |
| 3,532,645 | 10/1970 | Schulze et al. | 260/2 |
| 3,536,679 | 10/1970 | Langer | 260/83.1 |
| 3,560,450 | 2/1971 | Curotti | 260/78.3 |
| 3,890,278 | 6/1975 | Lehn et al. | 260/63 R |
| 4,116,887 | 9/1978 | Lehn et al. | 260/2 A |

OTHER PUBLICATIONS

Bywater, "Anionic Polymerization", at pp. 27-30, 47-53, & 64-69, vol. 4, *Progress in Polymer Science*, Edited by A. D. Jenkins, Pergamon Press, Oxford & N.Y., 1974.

*Primary Examiner*—Earl A. Nielsen
*Attorney, Agent, or Firm*—Bucknam and Archer

[57] ABSTRACT

A process for the anionic polymerization or copolymerization of olefinic monomers, dienic monomers, vinyl monomers and heterocyclic monomers is described which comprises reacting at least one monomer which is an olefinic monomer, a vinyl monomer or an heterocyclic monomer with a catalyst capable of inducing anionic polymerization and an aprotic macroheterocyclic cryptant, said at least one monomer being the only medium for the reaction.

The macroheterocyclic complexing agent has general formula

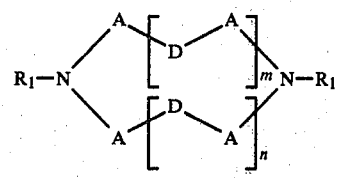

in which:
$R_1$ is hydrogen, a hydrocarbon radical or alkoxycarbonyl, or the two $R_1$ together can form a group of the general formula:

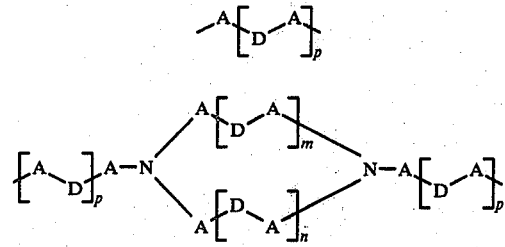

in which
A is a hydrocarbon radical,
D is oxygen, sulfur, or a hydrocarbon radical, with the proviso that at leat two of the D groups are oxygen or sulfur and that if $R_1$ is hydrogen, a hydrocarbon radical or alkoxycarbonyl, one of these two D groups is oxygen or sulfur and the other is oxygen, and
n and p are integers from 1 to 3 and m is 2 or 3.

17 Claims, No Drawings

PROCESS FOR THE ANIONIC POLYMERIZATION IN THE PRESENCE OF CRYPTANTS

The present application is a continuation-in-part of Ser. No. 539,729 filed Jan. 9, 1975, now U.S. Pat. No. 4,116,887, issued Sept. 26, 1978, which is a divisional of Ser. No. 401,119 filed Sept. 26, 1973. The latter issued as U.S. Pat. No. 3,890,278 on June 17, 1975.

United States application Ser. No. 539,729 and U.S. Pat. No. 3,890,278 describe a process for the anionic polymerization and copolymerization of vinyl monomers, dienic monomers and heterocyclic monomers in the presence of an organic solvent. The process is particularly significant because it utilizes in addition to a basic catalyst a complexing agent which is a macro-heterocyclic compound called a cryptant which enhances the properties of the basic catalyst.

One of the most remarkable advantages resulting from the use of the macro-heterocyclic complexing agent is the possibility of avoiding if desired the use of polar solvents and utilizing in place of the polar solvents solvents of low polarity of dielectric constant $\epsilon < 10$ which are much more interesting from a commercial point of view.

It has now been found that the enhancement of the basic properties of the catalyst under the action of the macro-heterocyclic complexing agents is such that the presence of a solvent medium is not required and that the basic catalyst acts also under conditions in which the monomer itself is the only medium.

It should be noted in this connection that the monomers capable of anionic polymerization have dielectric constant rarely higher and frequently substantially lower than 10 but that on the other hand these monomers rarely polymerize by the mechanism of mass polymerization at a sufficiently high rate to be of any practical commercial value by the mechanism of anionic polymerization in the presence of the commonly known catalysts.

The macro-heterocyclic complexing agents used in the present invention can be represented by the following general formula:

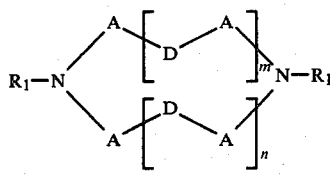

(I)

in which:

each $R_1$ is a hydrogen atom, a hydrocarbon group or an alkoxycarbonyl group, or the two $R_1$ together can form a group of the general formula:

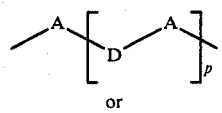

or

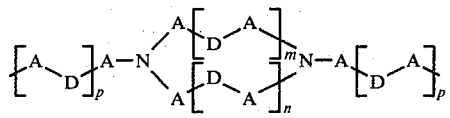

that is to say forming a third bridge between the two nitrogen atoms in the molecule.

A is a hydrocarbon group,

D is an oxygen or sulfur atom or a hydrocarbon group, with the proviso that at least two of the groups D are oxygen or sulfur atoms and that, if each $R_1$ is hydrogen, a hydrocarbon group or an alkoxycarbonyl group, one of these two groups D is oxygen or sulfur and the other is oxygen, n and p are integers ranging from 1 to 3, and m is 2 or 3.

The hydrocarbon groups represented by A and D preferably have 2 to 12 carbon atoms and are especially: straight-chain or branched alkylene and alkenylene groups with 2 to 8 carbon atoms, such as the ethylene, propylene, butylene and hexylene groups and their unsaturated analogues; cycloalkylene groups such as cyclohexylene and cycloheptylene groups and their unsaturated analogs; corresponding cycloalkylene-alkyl or dialkyl groups such as cyclohexylene-dimethyl, and aromatic groups such as phenylene and phenylene-alkyl or dialkyl groups preferably phenylene-dimethyl. The groups A which are adjacent to the nitrogen atom preferably have an aliphatic portion attached to N.

The hydrocarbon groups represented by $R_1$ preferably have 1 to 12 carbon atoms, and are especially straight-chain or branched alkyl groups with 2 to 8 carbon atoms. Other typical examples are cycloalkyl, aralkyl and aryl groups. The preferred alkoxycarbonyl groups represented by $R_1$ in the general formula (I) are those with up to 10 carbon atoms.

The preferred macro-heterocyclic compounds are those with the typical configurations shown below:

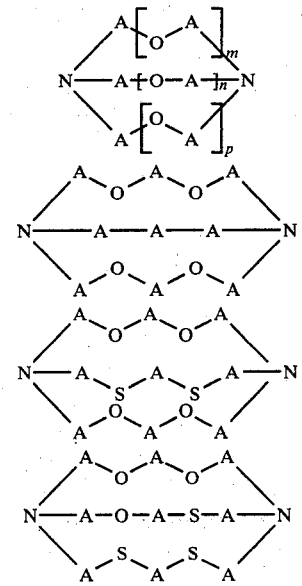

-continued

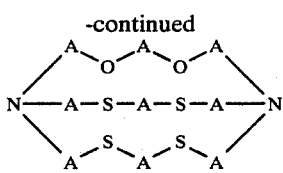

Examples of macro-heterocyclic compounds are those in which

A = —CH$_2$—CHR—
A = —CH$_2$—CHR—CH$_2$ ou -CHR—CH$_2$—CH$_2$—

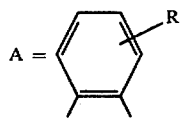

and R is a hydrocarbon radical.

More particularly, the preferred macro-heterocyclic compounds used in the present invention are represented by the following general formula:

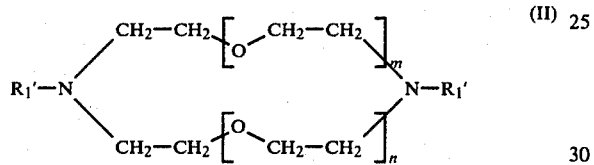

in which:
the two substituents R$_1$' together represent one of the following chain links forming a third bridge between the two nitrogen atoms of the molecule

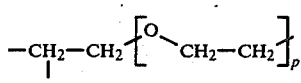

or

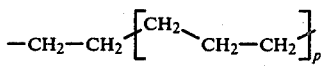

or

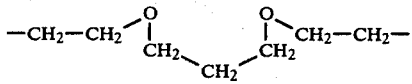

or

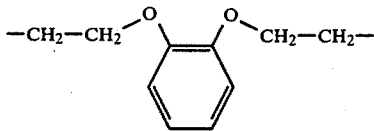

or

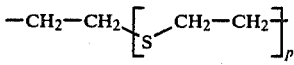

or

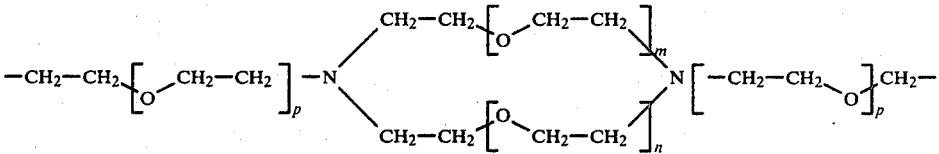

and n and p are integer numbers between 1 and 3 and m is equal to 2 or 3.

Typical examples of these compounds are the following:

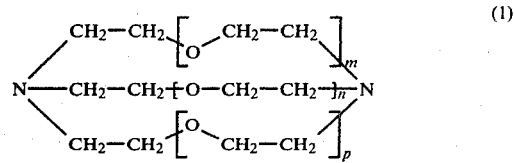

wherein n and p are integers from 1 to 3 and m is 2 or 3, especially:

in the case of m=2, n=1 and p=1

1,10-diaza-4,7,13,18-tetraoxa-bicyclo[5,5,8]eicosane, referred to as compound [211]

in the case of m=2, n=2 and p=1

1,10-diaza-4,7,13,16,21-pentaoxa-bicyclo[8.8,5]tricosane, referred to as compound [221]

in the case of m=2, n=2 and p=2

1,10-diaza-4,7,13,16,21,24-hexaoxa-bicyclo[8,8,8]hexacosane, referred to as compound [222]

in the case of m=3, n=2 and p=2

1,13-diaza-4,7,10,16,19,24,27-heptaoxa-bicyclo[8,8,11-]nonacosane, referred to as compound [322]

in the case of m=2, n=2 and p=0

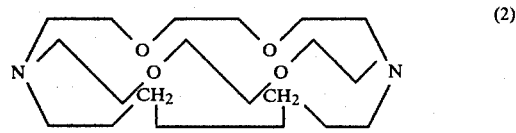

1,10-diaza-13,16,21,24-tetraoxa-bicyclo[8,8,8]hexacosane, referred to as compound [220]

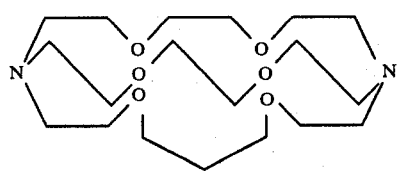
(3)

1,10-diaza-4,7,13,16,21,25-hexaoxa-bicyclo[8,8,9]heptacosane, referred to as compound [22p]

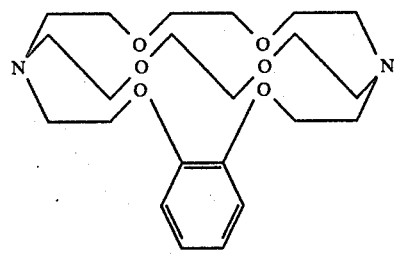
(4)

1,10-diaza-4,7,13,16,21,24-hexaoxa-5,6-benzo-bicyclo[8,8,8]hexacosane, referred to as compound [22B]

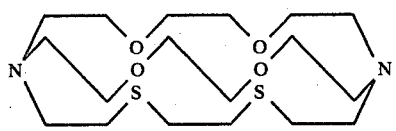
(5)

1,10-diaza-4,7,13,16-tetraoxa-21,24-dithia-bicyclo[8,8,8]hexacosane, referred to as compound [402S]

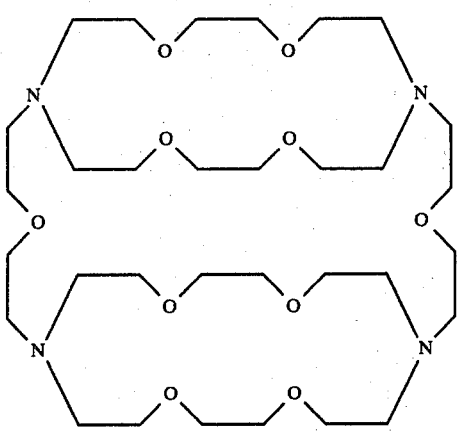

1,7,16,22-tetraaza-4,10,13,19,25,28,33,36,41,44-decaoxa-tricyclo[20.8$^{1,22}$0.8$^{1,22}$0.8$^{7,16}$]hexatetracontane, referred to as [T$_2$O]

These macro-heterocyclic compounds have an exceptional ability to form stable complexes with compatible cations. The bridges between the nitrogen atoms form, amongst themselves, a "cage" in which the cation is trapped (whence the name "cryptate" given to these complexes).

The capacity to form complexes and the stability of the complexes formed depend on the arrangement of the heteroatoms or groups surrounding the cation and on the relative diameters of the rings and of the cation. It results in a characteristic selectivity between cations and macro-heterocyclic compounds which is demonstrated in the present invention.

Each macro-heterocyclic molecule is capable of forming a complex with a cation. The value of the charge on the cation has no influence. These cations are generally inorganic cations.

The complexes with two cations may be prepared with some ligands of sufficient size for instance with the compound T$_2$O which forms binuclear complexes with the two cations Na$^+$ or K$^+$. It is also possible to utilize for instance the following cryptates:

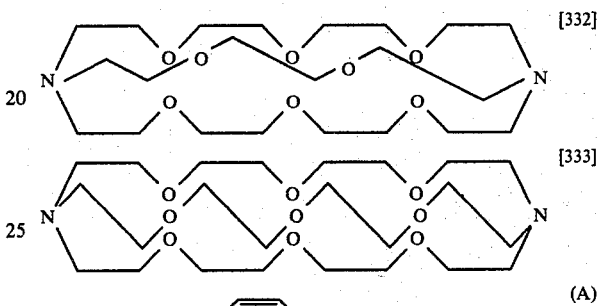
[332]

[333]

(A)

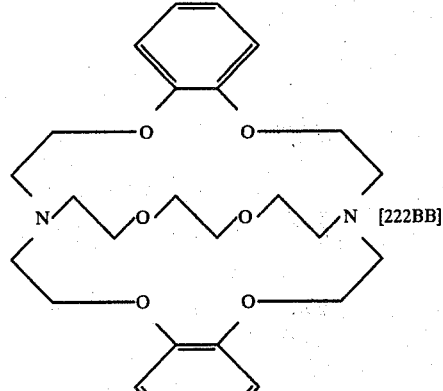
[222BB]

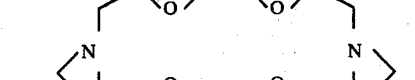

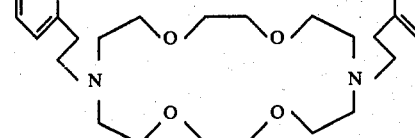

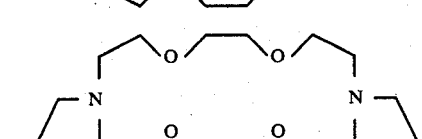

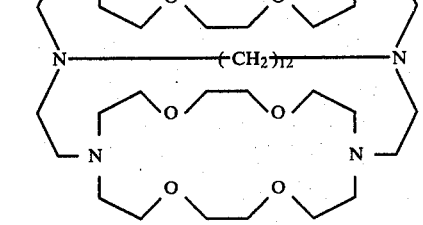

-continued

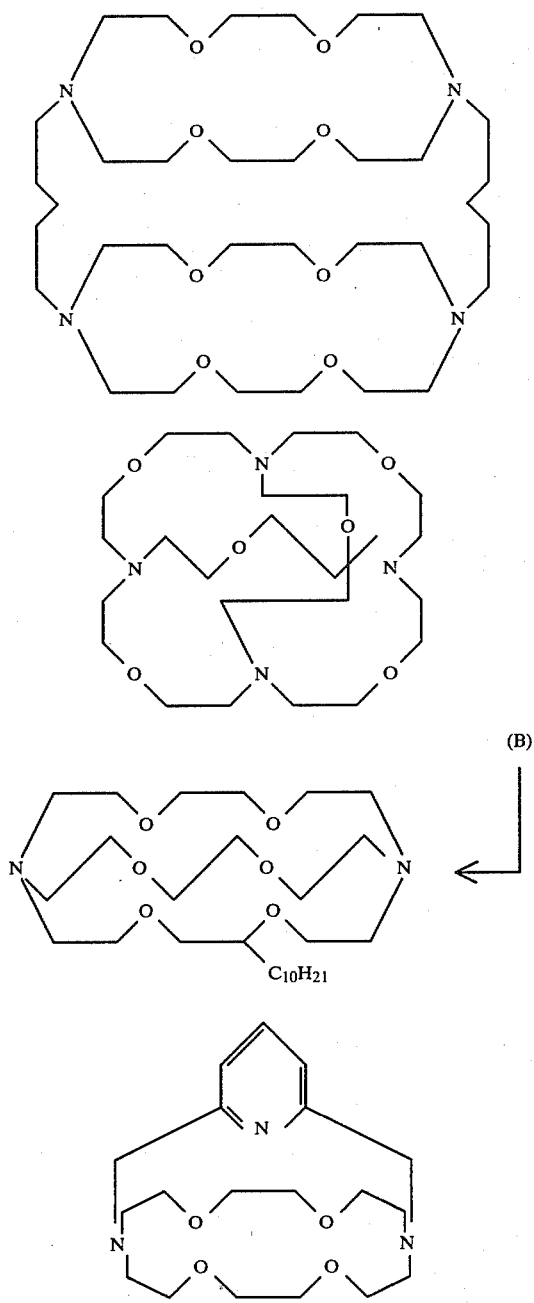

The cryptates A and B are marketed by MERCK under the respective names "Kryptofix 222BB and 222D". It is also possible to utilize polymer resins which carry cryptates, for instance the resin marketed by MERCK under the name "Dryptofix 222B polymer" the structure of which is

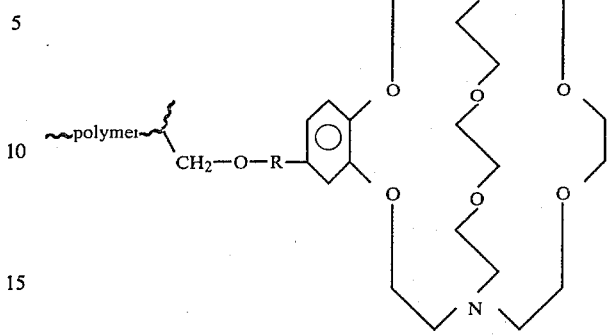

and it differs from compound [22B] only because of its attachment to a polymeric chain which does not modify in any way the complex forming properties of compound [22B]. Naturally the cryptants which contain some mobile hydrogen atoms which are non-aprotic, are excluded because they constitute a poison for the anions to the extent that they generate protons, that is the anions which are involved in the reactions of anionic polymerization.

The polymerization and copolymerization process by the anionic mechanism in accordance with the invention is characterized by the fact that one achieves the polymerization or the copolymerization in the presence of the monomer or the comonomers, an anionic catalyst and a macroheterocyclic complexing agent of the group of aprotic cryptants.

The vinyl monomers, dienic monomers and the heterocyclic monomers to which the present invention applies are all the monomers which are capable of anionic polymerization. Therefore, the monomers are particularly the following:

B. Mono-olefinic monomers and vinyl monomers of the general formula:

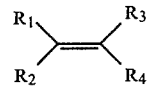

wherein $R_1$, $R_2$, $R_3$ and $R_4$ can be defined as follows:
$R_1=R_2=R_3=R_4=H$ (as in the case of ethylene)
$R_1=R_2=R_3=H$ and

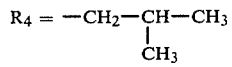

(as in the case of 4-methyl-1-petene)
$R_1=R_2=R_3=H$,

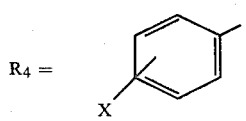

where X can be:
H (as in the case of styrene)
Cl or Br in the ortho, meta or para positions (as in the case of chlorostyrene or bromostyrene)

—OCH₃ (as in the case of p-methoxystyrene) and
—C(—CH₃)₃ (as in the case of p-tertiary butyl-styrene)
$R_1 = R_2 = H$, $R_3 = CH_3$,

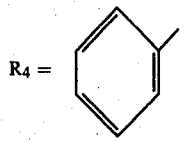

(as in the case of α-methylstyrene)
$R_1 = R_2 = R_3 = H$,

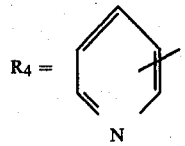

(as in the case of 2-vinylpyridine or 4-vinyl pyridine)
$R_1 = R_2 = R_3 = H$ and $R_4 = Cl$ (as in the case of vinyl chloride)
$R_1 = R_2 = R_3 = H$ and $R_4 = —C \equiv N$ (as in the case of acrylonitrile)
or $$R_4 = -\underset{\underset{O}{\|}}{C}-O-R'$$

R' being an alkyl or cycloalkyl radical (as in the case of alkyl or cycloalkyl acrylates)
$R_1 = R_2 = H$, $R_3 = CH_3$, with $R_4 = —C \equiv N$ (as in the case of methacrylonitrile)
or $$R_4 = -\underset{\underset{O}{|}}{C}-COR'$$

R' being an alkyl or cycloalkyl radical (as in the case of alkyl methacrylate or cycloalkyl methacrylate)
$R_1 = R_2 = R_3 = H$, $$R_4 = -\underset{\underset{O}{\|}}{C}-R'',$$

R'' = alkyl (as in the case of the vinyl ketones)

B. Diene monomers of the general formula

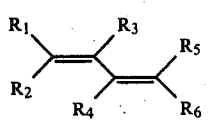   (B)

wherein $R_1$, $R_2$, $R_3$, $R_4$, $R_5$ and $R_6$ can be defined as follows:
$R_1 = R_2 = R_3 = R_4 = R_5 = R_6 = H$ (as in the case of 1,3-butadiene)
$R_1 = R_2 = R_4 = R_5 = R_6 = H$ and $R_3$ can be a substituent such as:
alkyl (as in the case of 2-alkyl-1,3-butadienes)
or aryl (as in the case of 2-aryl-1,3-butadienes)
or chloro (as in the case of 2-chloro-1,3-butadiene)
$R_2 = R_3 = R_4 = R_5 = R_6 = H$ and $R_1$ can be a substituent such as:
alkyl (as in the case of 1-alkyl-1,3-butadienes)
or aryl (as in the case of 1-aryl-1,3-butadienes)
or nitrile (as in the case of 1-cyano-1,3-butadiene)
or nitro (as in the case of 1-nitro-1,3-butadiene)
$R_1 = R_2 = R_5 = R_6 = H$ and $R_3 = R_4 = —CH_3$ (as in the case of 2,3-dimethyl-1,3-butadiene)
$R_1 = CH_3$ and $R_2 = R_3 = R_4 = R_5 = R_6$ and can be either H (as in the case of 1,3-pentadiene) and/or alkyl (as in the case of alkyl-1,3-butadiene)
$R_2 = R_3 = R_4 = R_5 = H$ and

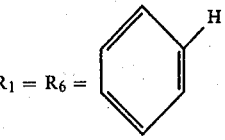

(as in the case of 1,4-diphenyl-1,3-butadiene).

HETEROCYCLIC MONOMERS

The following types of monomers are particularly involved:
epoxides, particularly ethylene oxide and propylene oxide;
episulfides and particularly propylene sulfide;
thietanes;
lactones particularly β propiolactone, ε caprolactone and pivalolactone;
lactams particularly ε caprolactam;
siloxanes particularly hexamethylcyclotrisiloxane and octamethylcyclotetrasiloxane;
cyclic carbonates particularly trimethylene carbonate, the cyclic carbonate from neopentyl glycol, the the cyclic carbonate from 2-methyl-2-propyl 1,3-propanediol, the cyclic carbonate from 2-ethyl 2-propyl 1,3-propanediol, the cyclic carbonate from 2-methyl 2-phenyl, 1,3-propanediol.

The basic catalysts which may be utilized within the scope of the present invention have in common the feature of containing an alkali metal or an alkaline earth metal or one of their cations. These catalysts are particularly:
metals of groups Ia and IIa and particularly lithium, sodium and potassium;
hydroxides of the metals of group Ia and particularly potassium hydroxide;
alkoxides from metals of groups Ia and IIa with the alcohol being an alkanol, a cycloalkanol or aromatic hydroxy compound and particularly tertiary butoxides, tertiary amyloxides and n-amyloxides of alkali metals;
amides of metals of group Ia and IIa of the type

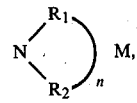

in which $R_1$ and $R_2$ are hydrogen, alkyl, cycloalkyl or aryl, M is a metal of groups Ia and IIa and n corresponds to the valence of the metal. Potassium carbazyl and sodium carbazyl are particularly useful;

compounds of formual $MX_n$ in which M is a metal of group Ia or IIa as well as the corresponding subgroups, n corresponding to the valence of the metal and X being a thiocyanate, a carbonate or a chloride or an acetate radical. Particularly significant are potassium thiocyanate, potassium acetate, potassium carbonate and sodium chloride;

organometallic derivatives of the type RM, both the mono and the bifunctional compounds in which M is a metal of group Ia or IIa and R is alkyl, cycloalkyl or aryl. Particularly n-butyl lithium and t-butyl lithium are significant in this category;

aromatic complexes of the metals of group Ia and IIa, particularly sodium naphthalene, lithium naphthalene and potassium naphthalene;

living oligomers and polymers both mono- and bifunctionale and particularly α methyl styrene in the form of its potassium or sodium salt; sodium 1,1-diphenyl ethylene, propylene polysulfide in the form of its sodium salt and lithium polystyrene.

The living polymers are interesting because they are much more stable than the initial catalysts and they permit better control of both in the polymerization reaction as well as in the preparation of copolymers.

Some of the catalysts previously listed are available in the solid state and may be utilized directly in the form of a film or in a finely divided state. Other catalysts are conventionally used in the form of a solution in organic solvents which may be polar, weakly polar or non-polar, the solvent being such that the catalyst is easily prepared in the corresponding solution. In accordance with the present invention the solvent is completely eliminated for this type of catalyst, that is the solvent in which the catalyst is prepared is removed prior to the reaction. Naturally one can remove in accordance with the present invention almost the entire amount of the solvent and a very small amount of the solvent remains with the catalyst, being understood that the expression "a small quantity of the solvent" means such an amount that the solvent cannot be recognized in the polymeric mass which one obtains at the end of the reaction.

In accordance with one embodiment of the process the solid catalyst is placed in a reactor or if the catalyst has been prepared in a solvent, one evaporates the solution of the catalyst to dryness in the reactor and then one introduces the monomer and the cryptant in the same reactor. It is possible to introduce the reactants into the reactor according to a different sequence. In any event, the procedure described hereinabove is to be preferred because it is the most convenient. The polymerization in the real sense requires the usual experimental conditions of anionic polymerization, keeping in mind that it is convenient to eliminate carefully all traces of moisture in the apparatus being used. The polymerization is carried out under vacuo possibly in an atmosphere of an inert gas which practically is nitrogen or argon. The reactants and particularly the monomer are purified according to methods well-known for reactants being used in an anionic polymerization, the degree of purity being a substantial factor in the quality of the final product. The macroheterocyclic complex or cryptant which is used is preferably selected as a function of the catalyst, the choice being determined by the radius of the metallic cation of the anionic catalyst. It should be noted that the substances which have the ability to form complexes, that is the cryptants, of greater stability constant with the cations of the different alkali metals and alkaline earth metals are well known; within the scope of the present invention the more stable the cryptants, the greater is the enhancement of the basic nature of the catalyst and the greater is the acceleration of the kinetics of polymerization.

The polymerization temperature in general is between −80° C. and 60° C. However, when the catalyst which is used is not one of the most favorable and/or when the cryptant which is associated with the catalyst is not one which gives most the stable cryptate with the cation of the catalyst being used, it may be necessary to warm the mixture to a temperature higher than 60° C. When the monomer is a solid at room temperature, it is necessary to raise the temperature up to the melting temperature of the monomer in order to carry out the polymerization. In this case a temperature higher than 60° C. is usually required. It is very advantageous to carry out the reaction in the presence of a cryptant and the catalyst appropriate for that cryptant because the temperature of the reaction being required under these conditions is much lower and further the reaction is much more rapid and the molecular weight achieved are much higher if this is desired.

In order to achieve very high molecular weight, the cryptant is used in a quantity which is at least equimolar and preferably in excess with respect to the anionic catalyst, an excess between 10 and 500% in moles being generally very satisfactory. If the cryptant is in amount insufficient with respect to the catalyst, however, the reaction still proceeds satisfactorily. On the other hand the molar proportion of the complexed catalyst with respect to the monomer is preferably in the order of 0.01–1%.

It is noted that the process according to the present invention permits to obtain polymers of molecular weight with small variation and very high. Besides the yields are usually excellent and the separation of the polymer which is prepared is easier as compared with the process in which a solvent is used. It is very surprising that the yields being achieved are so high. In fact one skilled in the art would have believed that the active catalyst centers would be destroyed in the mass of the polymer already formed which has a consistency of a gel or a solid and that the active catalytic centers would be isolated rapidly. However, the improvement resulting from the use of the cryptants is such that the reaction does not terminate, probably contrary to what one would have expected, that as a result of the exhaustion of the monomer, in the majority of the cases.

The invention may be illustrated by the following known limitative examples.

EXAMPLE 1

A mirror of metallic sodium is formed in a flask which is kept under a dynamic vacuum of $10^{-3}$–$10^{-4}$ Torr. The flask is closed under vacuo and it is then kept at a temperature of −50° C.; then styrene in the amount of 10 cc and cryptant [222] in the amount of $10^{-4}$ mole, which is soluble in styrene, are added by means of a cover which has a lowerable underskirt and by means of a hypodermic needle.

The reaction occurs instantaneously and the temperature must be lowered to −80° C. The product is a polymer, in 100% yield, of number molecular weight greater than $10^{-6}$, determined by chromatography and gel permeation. The living polymer is pink. The styrene monomer has a dielectric constant of 2.43 at 25° C.

EXAMPLE 2

The same procedure used in Example 1 is followed with 10 cc of α methyl styrene and $3.10^{-4}$ mole of compound [222]. The temperature is kept at $-50°$ C. for the entire reaction. After a few minutes, a polymer is obtained of number molecular weight in the range of 500,000 with a yield of 80%. The living polymer has a yellow pinkish color.

EXAMPLE 3

The same procedure used in Example 1 is used with 7 cc of 2-vinyl pyridine and $5.10^{-4}$ mole of compound [222] at a temperature of 80° C. The reaction is instantaneous and gives a polymer of mass greater than $10^{-6}$ with a yield of 100%. The living polymer has a purplish color.

EXAMPLE 4

The same procedure used in Example 2 is used for the polymerization of 5 cc of methyl methacrylate in the presence of $3.10^{-4}$ mole of compound [222].

The reaction is instantaneous and gives a polymer of mass 400,000 with a yield of 100%. The living polymer is yellow.

EXAMPLE 5

The same procedure used in the preceding example is applied to 10 cc of isoprene in the presence of $10^{-4}$ mole of compound [222]. At the end of a few minutes there is obtained polyisoprene of mass greater than $10^6$ with a yield of 100%. The living polymer is yellow. Isoprene monomer has a dielectric constant of 2.10 at 25%.

EXAMPLE 6

Acrylonitrile in the amount of 5 cc is polymerized according to the procedure of Example 1 in the presence of $10^{-5}$ mole of compound [222]. The reaction is instantaneous at $-80°$ C. and is accompanied by the appearance of a yellow color together with an immediate solidification of the entire mass. $\overline{Mn}=300,000$, yield 100%.

EXAMPLE 7

The manner of operation is the same as in Example 6 applied to 8 cc of methacrylonitrile in the presence of $3.10^{-5}$ mole of compound [221]. The reaction is instantaneous and the polymer obtained has a yellow-orange color. $\overline{Mn}=50,000$; yield = 90%.

EXAMPLE 8

A film of potassium is deposited on the inner surface of the reaction vessel. The reaction is carried out under the conditions of Example 2, that is at $-50°$ C. from 12 cc of butadiene and $4.10^{-5}$ mole of compound [222]. The polymerization occurs within 10 minutes and the yield is 80%. $\overline{Mn}=35,000$.

In this experiment it is noted that a period of time goes by prior to the time when the catalyst becomes effective. The reaction mixture is stirred for 10 minutes prior to termination of the reaction.

EXAMPLE 9

Acrylonitrile in the amount of 3 cc is polymerized at 20° C. in the presence of $10^{-4}$ mole of compound [222] and the $10^{-4}$ mole of potassium carbazyl. The latter substance is prepared by reacting initially a film of potassium in tetrahydrofuran with carbazole and then evaporating the solvent to dryness.

The reaction is instantaneous and it is accompanied by the appearance of a yellow color and an immediate solidification of the mass. The entire reaction is carried out in an atmosphere of argon. $\overline{Mn}=35,000$; yield = 100%.

EXAMPLE 10

In the reaction vessel which is to be used for the polymerization are placed $10^{-3}$ mole of n-butyl lithium in heptane. After evaporation of the solvent to dryness there is introduced in an atmosphere of argon 3 cc of methacrylonitrile containing $10^{-3}$ mole of compound [211]. The initiation is relatively slow at 20° C. but the propagation is very rapid and is accompanied by a substantial evolution of heat. At the end of five minutes a polymer of 25,000 molecular weight is obtained. Yield = 80%.

EXAMPLE 11

The reaction is carried out as in Example 10 from $10^{-4}$ mole of n-butyl lithium and 3 cc of butadiene which contains $10^{-4}$ mole of compound [221]. Temperature: 20° C.

Very rapidly a yellow color develops and the reaction mixture becomes viscous at the end of a few minutes. After 30 minutes the polymer is collected. Molecular weight = 10,000; yield = 75%.

EXAMPLES 12-16

Several monomers are polymerized by means of sodium carbazyl and potassium carbazyl, the two catalysts being prepared from a mirror of the metal in tetrahydrofuran. The concentration of the carbazyl salts is measured by UV spectral analysis. The solvent is then evaporated and the monomer which contains the cryptant is heated. The reaction takes place under a vacuum of about $10^{-5}$ mm of mercury.

The experimental conditions and the results of the reaction are summarized in the table hereinbelow:

| Ex. | Monomer | Catalyst | Cryptant | Temp. in degrees centigrade | Length of reaction | Yield | Mn | Remarks |
|---|---|---|---|---|---|---|---|---|
| 12 | Styrene 10 cc | Carbazyl Na ($4.10^{-5}$ mole) | [221] $4.10^{-5}$ mole | $-40°$ C. | 2 a 3 mn | 80% | 200000 | Rapid gel, rose. |
| 13 | Styrene 10cc | Carbazyl K ($3,7.10^{-5}$ mole) | [222] $5.10^{-5}$ mole | $-35°$ C. | instantaneous | 85% | 500000 | Instant gel, red. |
| 14 | Acrylonitrile 5cc | Carbazyl Na [$10^{-4}$ mole] | [222] ($8.10^{-5}$ mole) | $-50°$ C. | instantaneous | 95% | 100000 | Precipitate yellow. |
| 15 | Methacrylonitrile 8cc | Carbazyl K $10^{-4}$ mole | [222] $10^{-4}$ mole | $-35°$ C. | instantaneous | 90% | 80000 | Precipitate orange. |
| 16 | Methyl methacrylate | Carbazyl Na $8.10^{-5}$ mole | [222] $10^{-4}$ mole | $-40°$ C. | instantaneous | 75% | 150000 | Precipitate white. |

| | | | Temp. in | | | | |
|---|---|---|---|---|---|---|---|
| Ex. | Monomer | Catalyst | Cryptant | degrees centigrade | Length of reaction | Yield | Mn | Remarks |
| | 10 cc | | | | | | | |

EXAMPLE 17

β-propiolactone, in the amount of $3.5.10^{-2}$ mole, containing $6.1.10^{-5}$ mole of compound [221] is polymerized under vacuo by means of $6.10^{-5}$ mole of sodium chloride the latter being placed at the bottom of the reactor prior to the addition of the other reactants. After letting stand for 24 hours at 20° C. the yield of the polymer is quantative.

The viscosity of the polymer so obtained is $[\eta]=0.41$ dl/g at 25° C. in CHCl$_3$.

EXAMPLE 18

The reaction is carried out as in Example 12 from $1.2.10^{-5}$ mole of potassium carbazyl. After complete evaporation of tetrahydrofuran, ethylene oxide, in the amount of $4.3.10^{-2}$ mole, containing $6.6.10^{-5}$ mole of compound [222] is added.

The polymerization carried out under vacuo is instantaneous at ordinary temperature and is accompanied by a strong evolution of heat. After 5 minutes the yield is quantative. $\overline{M}n=76,000$; determined osmometrically.

Ethylene oxide has dielectric constant of 13.9 at −1° C.

EXAMPLE 19

Anhydrous potassium carbonate, in the amount of $2.2.10^{-5}$ mole is placed in a reactor and then there is added $3.1.10^{-5}$ mole of compound [402S] in $2.10^{-2}$ mole of propylene sulfide ($\epsilon=10.2$ at 20° C.). At the end of 24 hours at 20° C., under vacuo a polymer is obtained of $\overline{M}n=$ about 300,000, determined osmometrically. The yield is quantitative.

EXAMPLE 20

Compound [211], in the amount of $10^{-4}$ mole is introduced after distillation in a quartz vessel into a solution of $3.2.10^{-2}$ mole of octamethyl cyclotetrasiloxane in a vessel containing $10^{-4}$ mole of dry n-butyl lithium.

The mixture is warmed under vacuo at 40° C. for a period of one hour and then it is allowed to stand 65 hours under vacuo at 20° C. The reaction is stopped by addition of CO$_2$.

Yield=11%. Viscosity $[\eta]=0.31$ dl/g at 25° C. in toluene, that is $\overline{M}v=61,000$. The monomer has a dielectric constant equal to 2.39 at 20° C.

EXAMPLE 21

The cyclic carbonate of neopentylglycol of formula

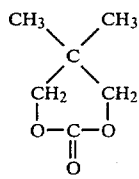

in the amount of $1.5.10^{-2}$ mole and containing $8.7.10^{-5}$ mole of compound [222] is polymerized over $5.10^{-2}$ mole of anhydrous potassium. The reaction is carried out under vacuo for a period of one hour at 160° C. and then 17 hours at 115° C. The yield is quantitative.

The viscosity of the polymer is $[\eta]=0.217$ dl/g at 30° C. in CH$_2$Cl$_2$. $\overline{M}n=19,000$ (GPC).

EXAMPLE 22

The same monomer as in Example 21, in the amount of $1.5.10^2$ mole is polymerized in the presence of $2.1.10^{-5}$ mole of compound [222], over $3.8.10^{-5}$ mole of dry potassium acetate. After heating for 24 hours under vacuo at 115° C. the yield of the polymer is quantitative. Viscosity $[\eta]=0.290$ dl/g at 30° C. in CH$_2$Cl$_2$. $\overline{M}n=24,000$ (by GPC).

EXAMPLE 23

Trimethylene carbonate in the amount of $1.7.10^{-2}$ mole, containing $6.6.10^{-5}$ mole of compound [222] is polymerized over $6.6.10^{-5}$ mole of dry potassium acetate.

After 18 hours heating under vacuo at 90° C. the yield of the monomer is quantitative.

$\overline{M}n=45,000$ by GPC.

EXAMPLE 24

By way of comparative example, the same monomer as in Example 23, in the amount of $1.8.10^{-2}$ mole is polymerized using $2.33.10^{-5}$ mole of compound [222] and $5.4.10^{-5}$ mole of potassium acetate. Clearly the cryptant is present in amount which is less than the stoichiometric amount with respect to the catalyst.

At the end of 43 hours at 85° C. under vacuo there is obtained a quantitative yield of polymer. Viscosity not higher than 0.08 dl/g at 30° C. in THF.

$\overline{M}n=900$ (GPC).

EXAMPLE 25

Trimethylene carbonate, in the amount of $2.02.10^{-2}$ mole, containing $2.23.10^{-5}$ mole of compound [222] and $2.4.10^{-4}$ mole of potassium is polymerized under conditions in which the cryptant is in amount less than the stoichiometric amount with respect to the catalyst.

At the end of 25 hours at 115° C. under vacuo, there is obtained a polymer. Viscosity 0.7 dl/g at 30° C. in THF. Molecular weight determined by GPC is low, $\overline{M}n=3,000$.

EXAMPLE 26

The cyclic carbonate of 2-methyl 2-propyl 1,3-propanediol, in the amount of $1.3.10^{-2}$ mole of formula

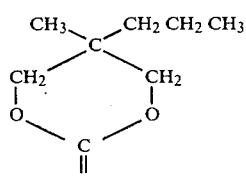

containing $6.4.10^{-5}$ mole of compound [222], is polymerized in the presence of $7.1.10^{-5}$ mole of potassium acetate.

At the end of 18 hours under vacuo at 90° C. the yield is quantitative. $\overline{M}n = 9,000$ (GPC).

EXAMPLE 27

The cyclic carbonate of 2-ethyl 2-propyl 1,3-propandiol of formula

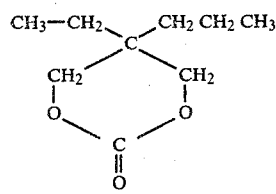

in the amount of $1.05.10^{-2}$ mole is polymerized under the same conditions as Example 24, in the presence of $6.5.10^{-5}$ mole of compound [222] and $6.5.10^{-5}$ mole of potassium acetate. The yield is quantitative. The molecular weight of the polymer is $\overline{M}n = 15,500$, by GPC.

EXAMPLE 28

The polymerization of the cyclic carbonate of 2-methyl 2-phenyl 1,3-propanediol, in the amount of $9.2.10^{-3}$ mole, containing $6.8.10^{-5}$ mole of compound [222] is carried out by adding the mixture to $6.2.10^{-5}$ mole of potassium acetate. At the end of 17 hours heating under vacuo at 90° C., the yield is quantitative. The molecular weight of the polymer is $\overline{M}n = 15,500$ by GPC.

What we claim is:

1. A process for the anionic polymerization or copolymerization of monomers containing ethylenic unsaturation and heterocyclic monomers which comprises reacting at least one monomer which is a vinyl monomer or an heterocyclic monomer with a catalyst capable of inducing anionic polymerization and an aprotic macroheterocyclic cryptant, said at least one monomer being the only medium for the reaction, said macroheterocyclic cryptant being heterobicyclic, heterotricyclic or heterotetracyclic and containing as heteroatoms: (1) N; (2) N and O; (3) N, S and O; (4) N and S, said cryptant being able of forming a cryptate after entrapping a cation.

2. The process according to claim 1 wherein said macroheterocyclic cryptant has general formula

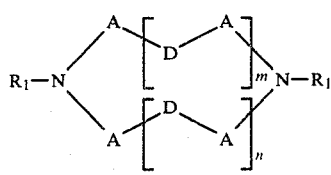

in which:
   $R_1$ is hydrogen, a hydrocarbon radical or alkoxycarbonyl, or the two $R_1$ together can form a group of the general formula:

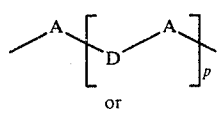

-continued

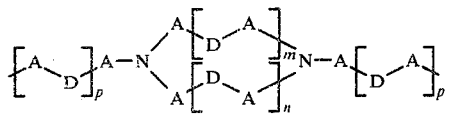

in which
   A is a hydrocarbon radical,
   D is oxygen, sulfur, or a hydrocarbon radical, with the proviso that at least two of the D groups are oxygen or sulfur and that if $R_1$ is hydrogen, a hydrocarbon radical or alkoxycarbonyl, one of these two D groups is oxygen or sulfur and the other is oxygen, and
   n and p are integers from 1 to 3 and m is 2 or 3.

3. A process according to claim 2 wherein the macroheterocyclic cryptant has the formula:

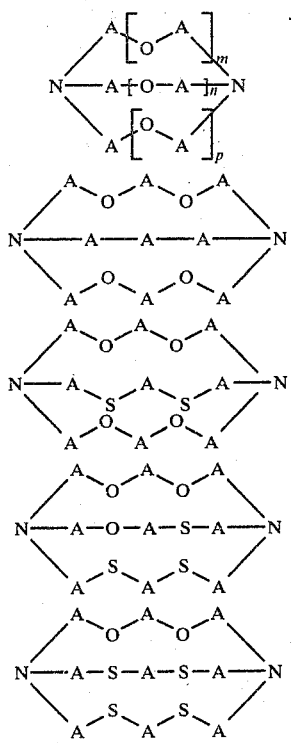

in which A, m, n and p are as defined in claim 2.

4. A process according to claim 3 wherein A is $$-CH_2-CHR-,$$
$$-CH_2-CHR-CH_2-$$
$$-CHR-CH_2-CH_2-,$$

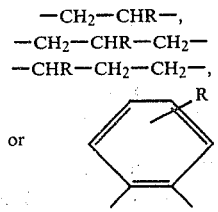

where R is a hydrocarbon radical.

5. A process according to claim 2, wherein the macroheterocyclic cryptant has the formula:

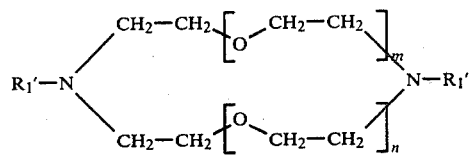 II

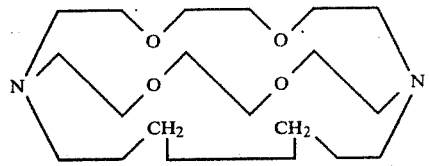

in which the two substituents $R_1'$ together represent one of the following chain links forming a third bridge between the two nitrogen atoms of the molecule:

or 1,10-diaza-13,16,21,24-tetraoxa-bicyclo[8,8,8]hexacosane.

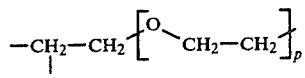

or 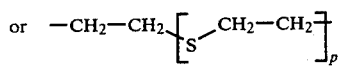

or 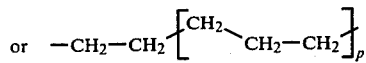

or 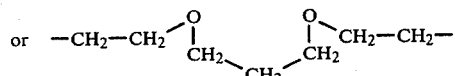

or 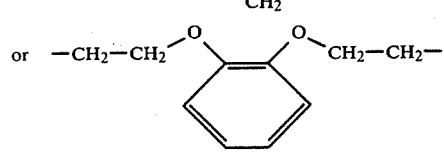

or

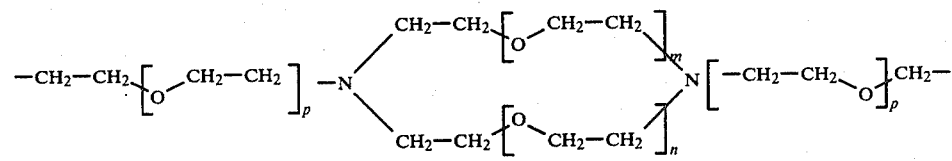

wherein n and p and m are as defined in claim 2.

6. A process according to claim 5, wherein the macroheterocyclic cryptant has the formula

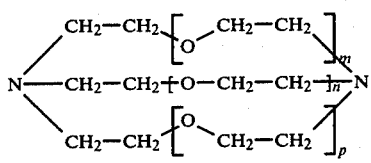

in which n and p and m are as defined in claim 2.

7. A process according to claim 6 wherein the macroheterocyclic cryptant is
1,10-diaza-4,7,13,18-tetraoxa-bicyclo[5,5,8]eicosane,
1,10-diaza-4,7,13,16,21-pentaoxa-bicyclo[8,8,5]tricosane,
1,10-diaza-4,7,13,16,21,24-hexaoxa-bicyclo[8,8,8]hexacosane, or
1,13-diaza-4,7,10,16,19,24,27-heptaoxa-bicyclo[8,8,11]nonacosane 8. A process according to claim 5, wherein the cryptant is 1,10-diaza-4,7,13,16,21,26-hexaoxa-bicyclo[8,8,9]heptacosane.

9. A process according to claim 5, wherein the cryptant is 1,10-diaza-4,7,13,16,21,24-hexaoxa-5,5-benzobicyclo[8,8,8]hexacosane.

10. A process according to claim 5, wherein the cryptant is 1,10-diaza-4,7,13,16-tetraaxa-21,24-dithia-bicyclo[8,8,8]hexacosane.

11. A process according to claim 5, wherein the cryptant is 1,7,16,22-tetraaza-4,10,13,19,25,28,33,36,41,44-decaoxa-tricyclo[20.8.1$^{1,22}$.8$^{1,22}$.8$^{7,16}$]hexatetra-contane.

12. A process according to claim 2, wherein the catalyst is a member selected from the group consisting of:
(1) a metal of group Ia or IIa;
(2) a hydroxide of a metal of group Ia;
(3) an alcoholate of a metal of group Ia or IIa;
(4) an amide of a metal of group Ia or IIa of the type

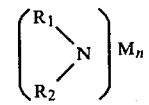

wherein R₁ and R₂ are hydrogen or an alkyl, cycloalkyl or aryl and M is a metal of group Ia or IIa, n being the valence of the metal;

(5) a compound MX_n wherein
M is a metal of group Ia or IIa or of the corresponding sub-group, in which
n is the valence of the metal, and
X is thiocyanate, carbonate, chloride or acetate;

(6) a monofunctional or difunctional organo-metallic derivative of formula RM wherein M is a metal of group Ia or IIa, and R is an alkyl, cycloalkyl or aryl radical, (7) an aromatic complex of a metal of group Ia or IIa, and (8) a living monofunctional or difunctional oligomer or polymer.

13. A process according to claim 12, wherein the catalyst is a member selected from the group consisting of:
(1) metallic lithium, sodium, potassium caesium,
(2) potassium hydroxide,
(3) an alkali metal t-butylate, t-amylate or n-amylate,
(4) potassium thiocyanate, potassium bromide and potassium acetate,
(5) n-butyl-lithium, t-butyl-lithium, carbazyl-potassium and carbazyl-sodium,
(6) naphthalene-sodium, naphthalene-lithium and naphthalene-potassium, and
(7) α-methylstyrene-sodium, or α-methylstyrene-potassium, 1,1-diphenylethylene-sodium or potassium, poly(propylene sulfide) sodium and polystyrene-lithium.

14. A process according to claim 1, wherein the cryptant is present in at least equimolecular amount, relative to the catalyst.

15. A process according to claim 1 wherein the catalyst is first prepared in solution in a non-polar or slightly polar solvent medium, the solvent is evaporated, then the monomer and the macroheterocyclic agent are added thereto.

16. The process according to claim 1 wherein the monomer is styrene, α-methyl styrene, 2-vinyl pyridine, methyl methacrylate, isoprene, acrylonitrile, methacrylonitrile, butadiene, β-propiolactone, ethylene oxide, propylene sulfide, octamethyl cyclotetrasiloxane, the cyclic carbonate of neopentyl glycol, trimethylene carbonate, the cyclic carbonate of 2-methyl-2-propyl 1,3-propanediol, 2-ethyl 2-propyl 1,3-propanediol, 2-phenyl-2-methyl 1,3-propanediol.

17. A process according to claim 1 wherein the macroheterocyclic cryptant is a member selected from the group of the compounds having the formula hereinbelow:

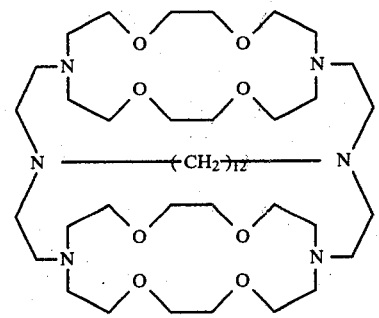

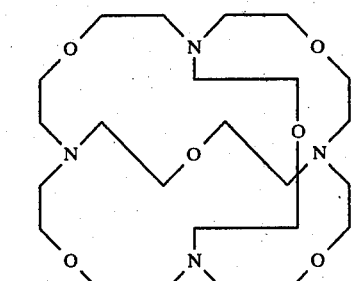

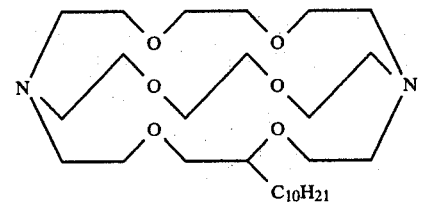

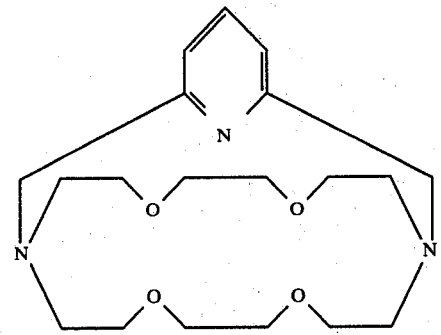

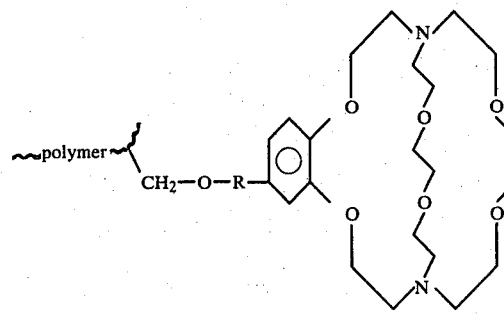

* * * * *